(12) United States Patent
Zweighaft

(10) Patent No.: US 6,285,518 B1
(45) Date of Patent: Sep. 4, 2001

(54) LIFE/WEAR MONITORING FOR MAGNETIC TAPE

(75) Inventor: James Zweighaft, Boulder, CO (US)

(73) Assignee: Exabyte Corporation, Boulder, CO (US)

( * ) Notice: Subject to any disclaimer, the term of this patent is extended or adjusted under 35 U.S.C. 154(b) by 0 days.

(21) Appl. No.: 09/140,340

(22) Filed: Aug. 26, 1998

(51) Int. Cl.$^7$ ....................................................... G11B 5/02
(52) U.S. Cl. ................................................. 360/25; 360/31
(58) Field of Search ................................. 360/25, 31, 69, 360/53, 27

(56) References Cited

U.S. PATENT DOCUMENTS

| | | | |
|---|---|---|---|
| 4,485,674 | 12/1984 | Ragle | 73/432 R |
| 4,575,778 | 3/1986 | Vogelgesang | 360/132 |
| 4,797,753 | 1/1989 | Montgomery | 360/27 |
| 5,426,355 | 6/1995 | Zweighaft | 318/304 |
| 5,602,694 | 2/1997 | Miles et al. | 360/84 |
| 5,712,539 | 1/1998 | Zweighaft et al. | 318/7 |
| 5,734,518 | 3/1998 | Hughes | 360/70 |
| 5,901,007 * | 5/1999 | Oguro et al. | 360/25 X |
| 5,926,777 * | 7/1999 | Vink et al. | 360/31 X |

* cited by examiner

*Primary Examiner*—Andrew L. Sniezek
(74) *Attorney, Agent, or Firm*—Nixon & Vanderhye, P.C.

(57) ABSTRACT

Apparatus (20) for transducing information relative to a recording media includes a transport system which transports the media (T) whereby predefined locations on the media, known as media wear milestones (MS1, . . . MSn), make a pass proximate a transducing element (90). A media wear monitoring system (180) determines when a pass occurs with respect to each of the predetermined media wear milestones on the media, and in accordance with the determination provides an indication of media wear. The transport system includes a media takeup reel (32), the angular position of which is utilized by the media wear monitoring system to locate the media wear milestones. The media wear monitoring system includes a media wear log (170) stored in a memory (160). The media wear log includes an indication of a number of passes which has occurred with respect to each of the media wear milestones. Upon loading of the media into the apparatus the media wear monitoring system reads an initial version of the media wear log from the media into the memory. During transport of the media, the media wear monitoring system detects reaching of the media wear milestones and updates the media wear log by incrementing the indication of the number of passes for the reached media wear milestones. Upon unloading of the media from the apparatus, the media wear monitoring system writes an updated media wear log on the media, e.g., to a physical beginning of the media.

50 Claims, 9 Drawing Sheets

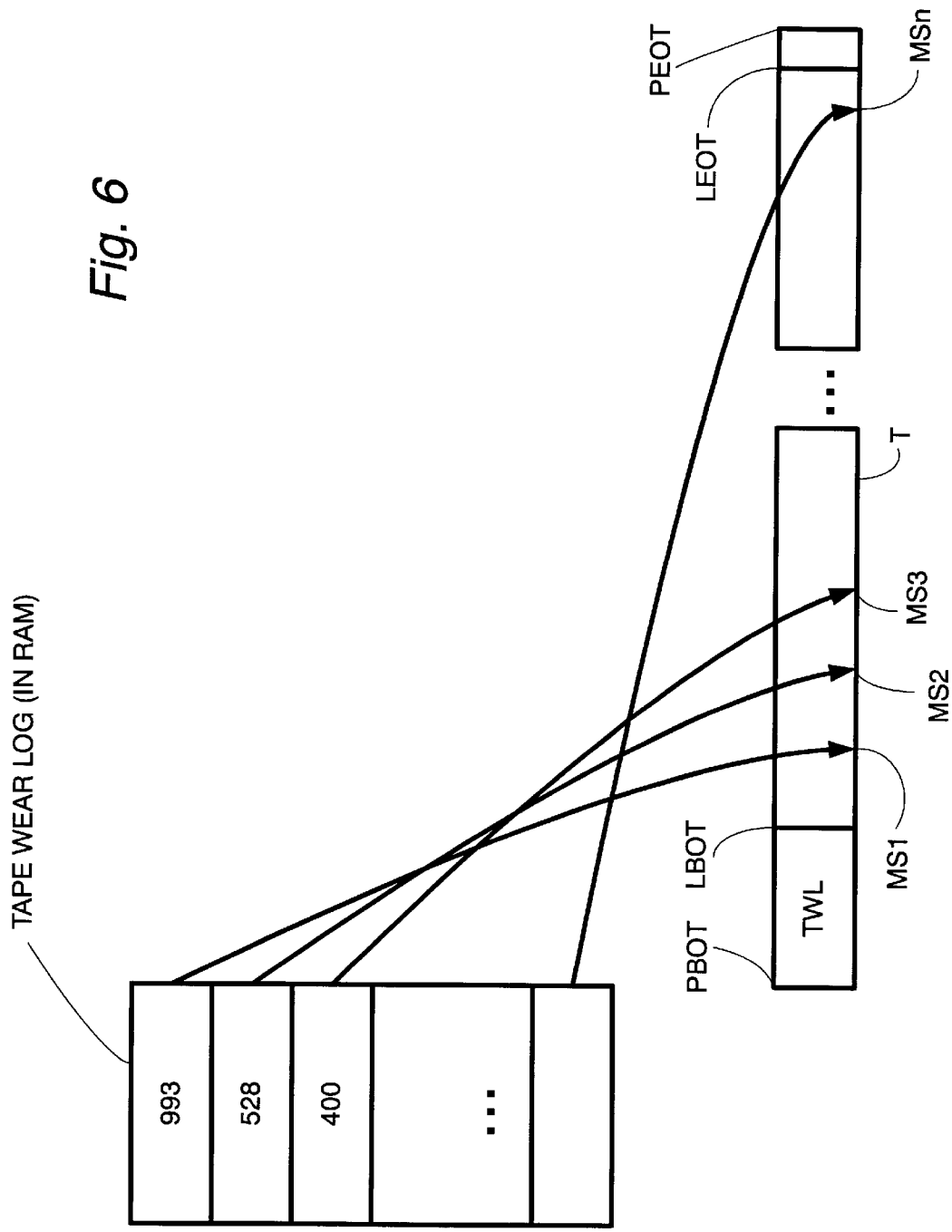

LIFE/WEAR MONITORING FOR MAGNETIC TAPE

BACKGROUND

1. Field of the Invention

This invention pertains to the storage or backup of data using magnetic tape drives, and particularly to determining the wear of tape upon which data is stored/retrieved by such drives.

2. Related Art and Other Considerations

In magnetic recording on tape using a magnetic tape drive, relative motion between a head unit (typically with both a write element and a read element) and the tape causes a plurality of tracks of information to be transduced with respect to the tape. The magnetic tape is typically housed in a cartridge which is loaded into the tape drive. The tape extends between a cartridge supply reel and a cartridge take-up reel. The tape drive typically has a supply reel motor for rotating the cartridge supply reel and a take-up reel motor for rotating the cartridge take-up reel.

After the cartridge is loaded into the tape drive, the tape is extracted or loaded by mechanisms in the drive so that a segment of the tape is pulled from the cartridge and into a tape path that travels proximate the head unit. In some tape drives the extraction mechanisms take the form of tape guides which are mounted on trolleys. During the extraction operation, trolley motors move the trolleys along a pre-defined trolley path, so that the tape guides which surmount the trolleys displace the tape into the tape path as the trolleys travel along the trolley path. When the trolleys reach the full extent of travel along the trolley path, the tape is proximate the head unit. Thereafter the tape can be transported past the head unit, e.g., by activation of a capstan and/or the supply reel and take-up reel motors, depending upon the particular type of transport mechanisms employed. A capstanless tape drive, particularly a tape drive which utilizes helical scan recording, is shown in U.S. Pat. No. 5,602,694 for CAPSTANLESS HELICAL DRIVE SYSTEM, which is incorporated herein by reference.

As the tape is transported past the head unit, information can be transduced to or from the tape by the tape drive in recording and reading operations, respectively. When the recording and/or reading operations are concluded, and before the cartridge can be unloaded from the drive, the tape must be retracted for return to the interior of the cartridge. Tape retraction is essentially the reverse of the tape extraction procedure described above.

Because removable media such as that housed in a tape cartridge can be reused many times, the issue of when a magnetic tape is worn out assumes great importance to the end user. If a tape is near its end of life, data errors become more common and the possibility of a catastrophic loss increases. Manufacturers of computer tape drives typically specify tape durability in terms of a maximum allowable number of "passes" of the head unit over the tape. In the simplest case, writing data to a tape might involve only two passes over a given spot of the tape: a first pass in the forwarded direction to write the data and a second pass in the reverse direction to return to the beginning of the tape prior to an unload of the cartridge. In practice, issues of formatting, data rate mismatches, and error recovery cause the tape motion to be much more complex. Certain sections of the tape might be subject to many passes during a given operation while nearby sections see much less activity. Measuring tape wear under such real world circumstances has traditionally been impossible. As a compromise, many tape drive systems instead measure other factors such as the number of rewinds or load cycles which are only indirectly related to the number of passes.

For example, as previously marketed, the Exabyte Mammoth™ tape drive attempts to determine remaining tape life indirectly by recording how often certain types of motion have occurred on a tape. However, no record is made of where these motions have occurred on the tape. A relatively small number of start/stop motions occurring in a small area of tape can wear out that section, whereas a much larger number of similar motions will not do so if spread out across a large section of tape.

Other approaches for discerning tape life are provided in the prior art. U.S. Pat. No. 4,797,753 to Montgomery employs a separate calibration track whose output level and frequency content is monitored for degradation. U.S. Pat. No. 4,575,778 to Vogelgesang describes a mechanical counting wheel which is advanced one per use of a cassette. U.S. Pat. No. 4,485,674 to Ragle teaches that a so-called "stagger wrap" profile of a reel is unique for each rewind cycle, and thus can be used to indicate the number of cycles.

What is needed, therefore, and an object of the present invention, is a technique for effectively and efficiently indicating tape wear.

SUMMARY

Apparatus for transducing information relative to a recording media includes a transport system which transports the media whereby predefined locations on the media, known as media wear milestones, make a pass proximate a transducing element. A media wear monitoring system determines when a pass occurs with respect to each of the predetermined media wear milestones on the media, and in accordance with the determination provides an indication of media wear. The transport system includes a media takeup reel, the angular position of which is utilized by the media wear monitoring system to locate the media wear milestones. Preferably a position sensor on the media takeup reel is used to determine when a milestone has been crossed (without requiring that anything be recorded on the media at that location). Alternatively, sensors of other types, such as an idler wheel attached to a rotating sensor and drive by the media itself, can be employed.

The media wear monitoring system includes a media wear log stored in a memory. The media wear log includes an indication of a number of passes which has occurred with respect to each of the media wear milestones. In other words, each milestone has an associated counter. An array of such counters is recorded on the media as the media wear log at an appropriate location, and preferably next to the unload point.

Upon loading of the media into the apparatus the media wear monitoring system reads an initial version of the media wear log from the media into the memory. During transport of the media, the media wear monitoring system detects reaching of the media wear milestones and updates the media wear log by incrementing the indication of the number of passes for each of the media wear milestones. Upon unloading of the media from the apparatus, the media wear monitoring system writes an updated media wear log on the media, e.g., to a physical beginning of the media.

In one embodiment, the media wear milestones are essentially uniformly distributed along a linear length of the media. In another embodiment, the media wear milestones are concentrated more closely together at a beginning of the media, e.g., in accordance with a square law distribution.

In one mode of the invention, the media wear monitoring system generates a signal indicative of worn media when a predetermined number of passes has occurred for one of the media wear milestones on the media. In another mode of the invention, the media wear monitoring system generates a signal indicative of extent of wear of the media. The signal generated by the media wear monitoring system is applied to an output device, such as a display device.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 6 is a diagrammatic view of a tape and a tape wear log and showing various uniformly spaced milestones employed in monitoring tape wear according to one mode of the present invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1A:
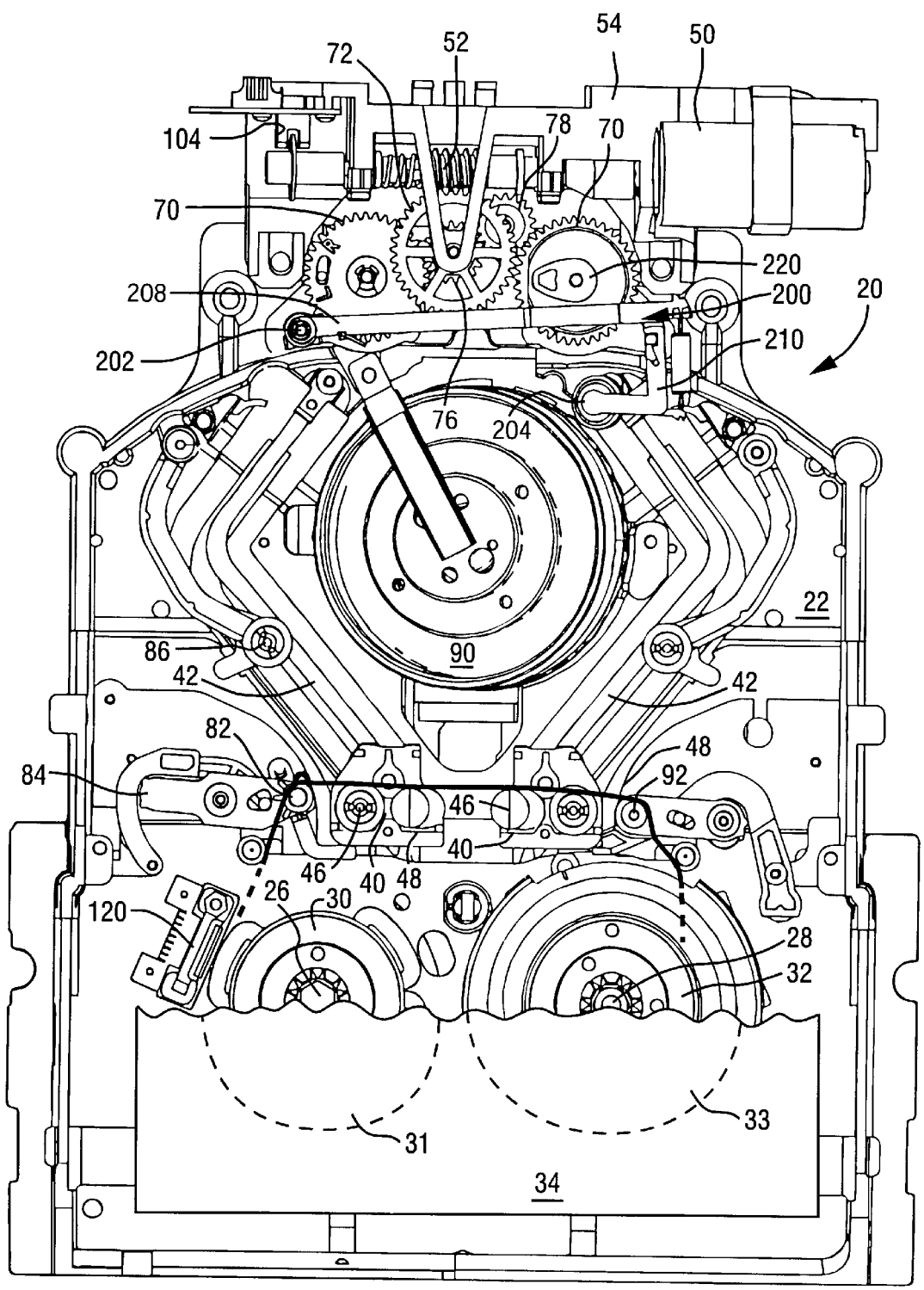
FIG. 1A is a top view of a tape drive of an embodiment of the present invention, with a tape drive housing cover removed, with tape in a tape retracted position and showing a portion of a cartridge.
Figure 1B:
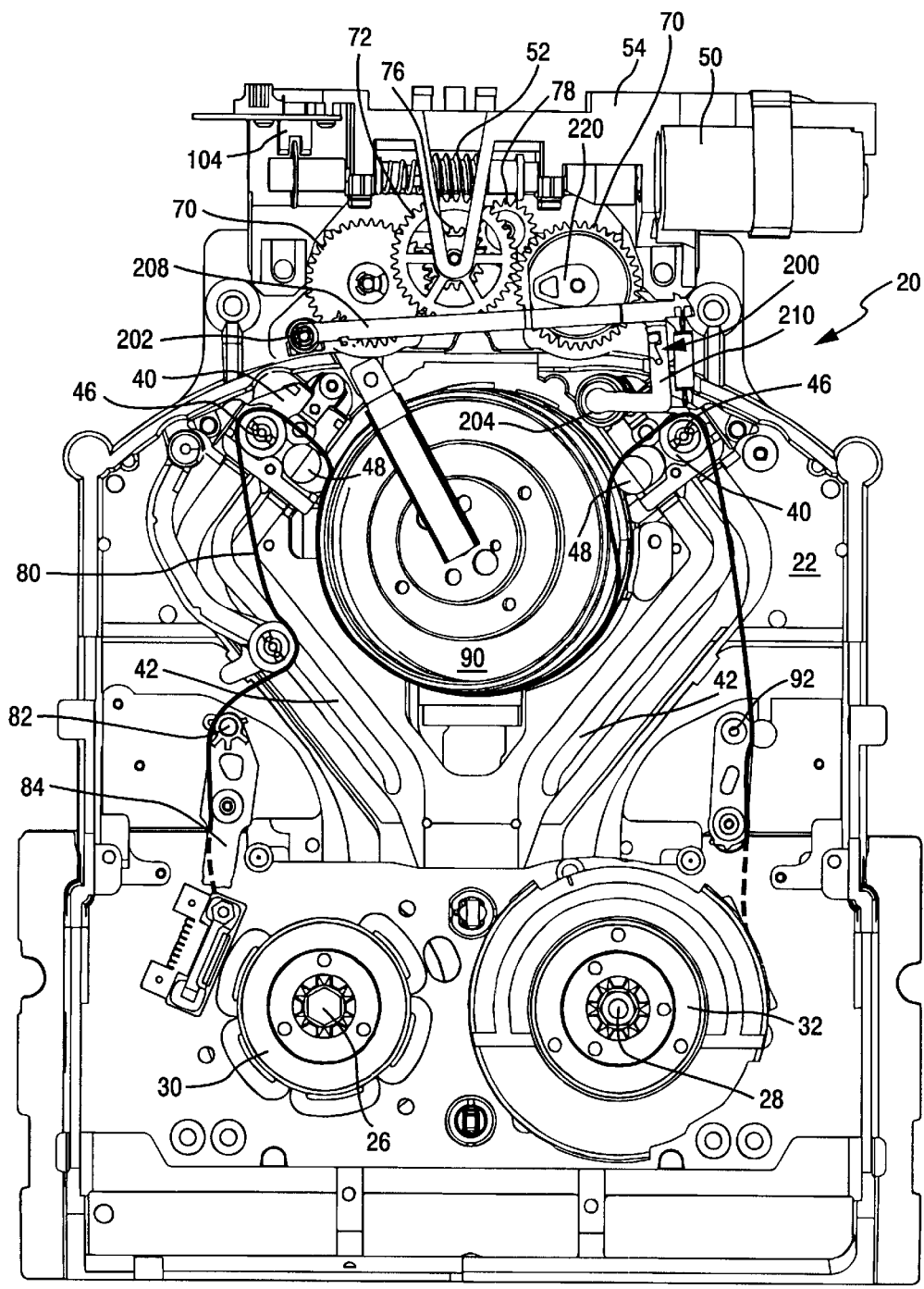
FIG. 1B is a top view of the tape drive of FIG. 1A (also with housing cover removed) but with the tape in a tape full extraction position.

FIG. 1A and FIG. 1B show a representative magnetic tape drive 20 which is employed to illustrate the present invention. While the representative tape drive 20 is a particular model of a helical scan tape drive, it should be understood that the present invention can be practiced on other models of helical scan tape drives and types of tape drives other than helical scan.

FIG. 1A shows tape drive 20 as having a chassis 22 which is visible by virtue of removal of an unillustrated drive housing cover. Tape drive 20 includes a supply reel spindle 26 and a take-up reel spindle 28, which are respectively rotatably driven by supply reel motor 30 and take-up reel motor 32. When, for example, a magnetic tape cartridge 34 is inserted into a cartridge slot in a front face of the unillustrated housing of drive 20, a supply reel 31 of the cartridge and a take-up reel 33 of the cartridge ultimately extend over spindles of respective supply reel spindle 26 and take-up reel spindle 28. Only portions of supply reel 31 and take-up reel 33 are shown in FIG. 1A, in order to permit viewing of the respective reel motors 30 and 32 underneath. Similarly, only a portion of cartridge 34 is depicted in FIG. 1A for the purpose of facilitating an understanding of the underlying structure.

Details of supply reel hub 26 and a take-up reel hub 28 are shown in U.S. Pat. No. 5,602,694 for CAPSTANLESS HELICAL DRIVE SYSTEM, which is incorporated herein by reference. Details of the supply reel motor 30 and the take-up reel motor 32 are understood with reference to one or more of the following (all of which are incorporated herein by reference): U.S. Pat. No. 5,712,539 entitled DIGITAL ACOUSTIC NOISE REDUCTION IN ELECTRIC MOTORS DRIVEN BY SWITCHING POWER AMPLIFIERS; and U.S. Pat. No. 5,426,355 entitled POWER-OFF MOTOR DECELERATION CONTROL SYSTEM.

Tape drive 20 also includes two trolleys 40 which are utilized to move tape between a tape retracted position and a tape extracted position. The two trolleys 40 travel along respective trolley paths 42. Trolley paths 42 are grooves formed in chassis 22. Trolleys 40 are described in more detail e.g., in U.S. patent application Ser. No. 09/045,702, entitled CLEANING OF MAGENTIC TAPE DRIVE, which is incorporated herein by reference.

When trolleys 40 are at an extreme front extent of trolley paths 42 as shown in FIG. 1A, any tape extending between the supply reel and the take-up reel is said to be in a tape fully retracted position. In the tape fully retracted position, the tape remains in the cartridge and extends between the tape supply reel and the take-up reel in essentially the same manner as if the cartridge were not inserted into the drive. While in the tape fully retracted position, tape guides 46 and 48 do not displace the tape from the nominal tape position of the cartridge.

Figure 3:
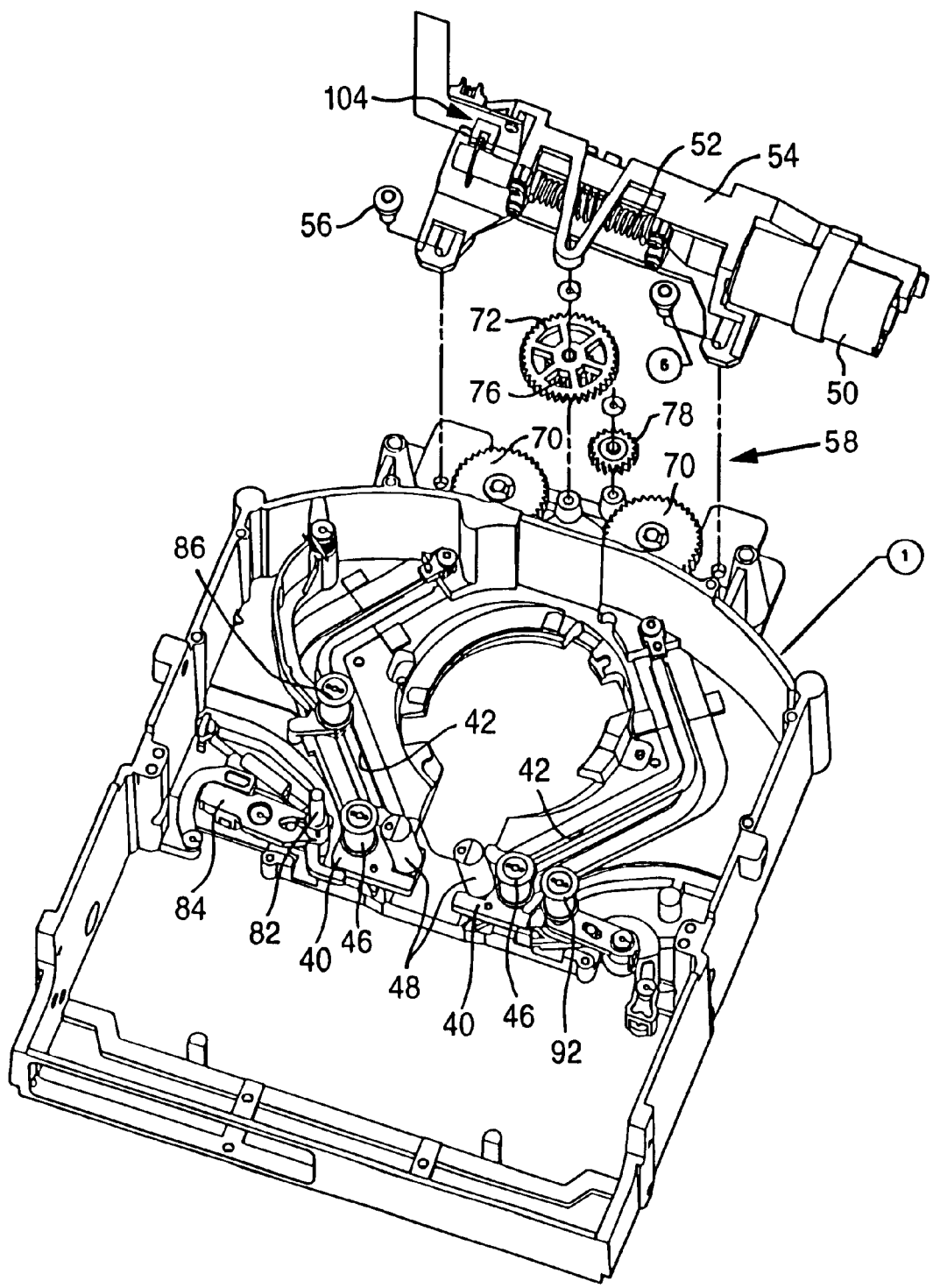
FIG. 3 is a top perspective view, partially exploded, of a tape drive of an embodiment of the present invention, with various elements removed for clarity.

Trolleys 40 travel along trolley paths 42 by being secured to a trolley transmission system. A tape load motor 50, also known as the trolley motor, acts through the trolley transmission system to move trolleys 40 along paths 42. As shown in FIG. 3, for example, tape load motor 50 has a helically threaded output shaft or gear 52. Tape load motor 50 is carried by motor bracket assembly 54. Motor bracket assembly 54 is secured to chassis 22 by fasteners 56.

Figure 4:
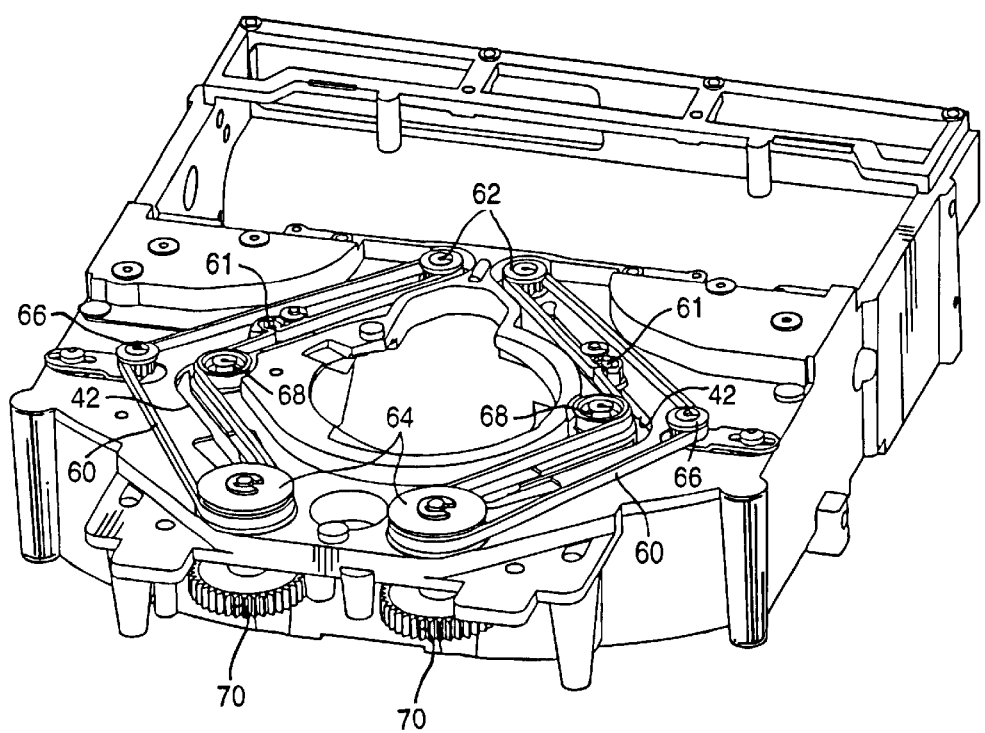
FIG. 4 is a bottom perspective view of a tape drive of an embodiment of the present invention, with various elements removed for clarity.

The trolley transmission system includes a set of gears 58 and trolley transmission belt 60. Each trolley 40 is secured to trolley transmission belt 60 by a clip device 61. FIG. 4 shows an exposed underside of tape drive 20, in which trolley transmission belts 60 are visible. Trolley transmission belts 60 are each entrained about trolley front pulley 62, trolley rear pulley 64, and trolley intermediate pulleys 66 and 68. Trolley rear pulleys 64 are mounted at first ends of shafts which have trolley overtravel gears 70 on their opposite ends. Gears 70, along with gears 72, 76, and 78, form gear set 58 (see FIG. 3).

Gear 72, carried by bracket 54, rotates about an unillustrated shaft and meshes with helically threaded gear 52.

Under gear 72 and also mounted to the shaft for uniform rotation with gear 72 is gear 76, which has a smaller diameter than gear 72. One of the gears 70, shown as a left one of the two gears 70 in FIG. 3, meshes with gear 76. The other of the gears 70, shown as a right one of the two gears 70 in FIG. 3, meshes with an auxiliary gear 78. Auxiliary gear 78 in turn meshes with gear 76. Thus, by virtue of meshing at least ultimately with gear 76, and since gear 76 rotates in accordance with the meshing of gear 72 with motor-driven helical gear 52, gears 70 rotate together as the helically geared output shaft 52 of motor 50 rotates. Simultaneous rotation of gears 70 causes simultaneous movement of trolley transmission belts 60, and thus of trolleys 40.

The system for movement of trolleys 40 having been described, it is understood how trolleys 40 move along trolley path 42. From the tape fully retracted position described above and illustrated in FIG. 1A, and upon generation of an tape extraction signal by tape drive 20, trolleys 40 move rearwardly into the drive along trolley path 42. FIG. 1B shows trolleys at the tape fully extracted position.

At the tape fully extracted position shown in FIG. 1B, the tape extends around an operative tape path of tape drive 20. Line 80, as shown in FIG. 1B, depicts both the tape and the operative tape path. As shown in FIG. 1B, the tape extends around tape guide 82 provided on swing arm 84; around tape guide 86; around tape guides 46 and 48 of a first trolley 40; around a portion of the periphery of drum or scanner 90; around tape guides 48 and 46 of a second trolley 40; and around tape guide 92. In the fully extracted position, unillustrated read and write heads mounted on the periphery of drum 90 travel along helical paths of the tape.

Some skilled in the art refer to tape extraction operation as being a tape load operation and a tape retraction operation as being a tape unload operation. While the present document chooses the "extraction" and "retraction" terminology primarily to avoid confusion with cartridge loading (into the drive) operations and cartridge unloading (from the drive) operations (as distinguished from tape loading and tape unloading), it should be understood that other terminology as such tape load and unload can be used to describe the extraction and retraction operations of the present invention.

As shown in FIG. 1A and FIG. 1B, tape drive 20 also has a scanner cleaning assembly 200. The scanner cleaning assembly 200 is anchored to chassis 22 at pivot point 202. Scanner cleaning assembly 200 includes a cleaning wheel 204 which selectively engages a periphery of scanner 90 for the purpose of removing debris from the write head(s) and read head(s) on scanner 90. Scanner cleaning assembly 200 is biased to a non-engagement position (e.g., in the counterclockwise direction about pivot point 202) by torsion spring 206. Torsion spring 206 is attached to a vertical shaft that is coaxial with pivot point 202.

Figure 2:
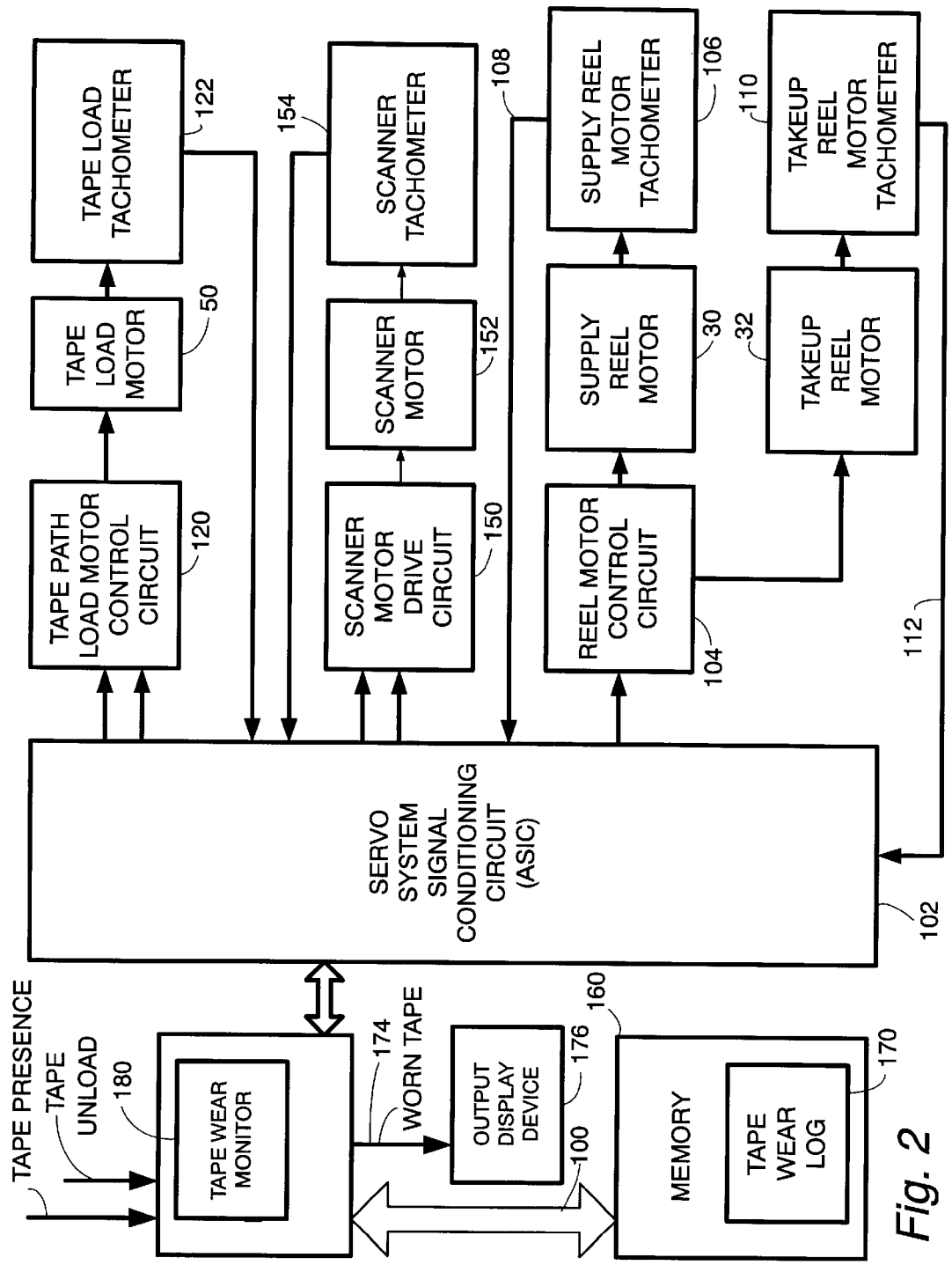
FIG. 2 is a schematic view of a portion of electronics included in the tape drive of FIG. 1A.

FIG. 2 shows motor and electronics components of tape drive 20 pertinent to the present invention. FIG. 2 particularly illustrates a processor 100 (e.g., a microprocessor) which executes coded instructions to perform operations hereinafter described. Processor 100 works through a servo system signal conditioning circuit 102 to which it is connected. Servo system signal conditioning circuit 102 in turn controls a reel motor control circuit 104.

Supply reel motor 30 rotates in accordance with a supply motor voltage applied thereto from reel motor control circuit 104. The rotational position of supply reel motor 30, and hence of the supply reel which surmounts spindle 26, is sensed by supply reel motor tachometer 106. Supply reel motor tachometer 106 generates a supply reel motor position signal on line 108 (2880 pulses per revolution in the illustrated embodiment). Similarly, reel motor control circuit 104 applies a voltage to take-up reel motor 32. The rotational position of take-up reel motor 32 is sensed by take-up reel motor tachometer 110 which generates a take-up reel motor position signal on line 112 (2880×8.14 pulses per revolution in the illustrated embodiment). Tachometers 106 and 110 are two phase type sensors that also yield directional information on every pulse. The position information ascertained from tachometers 106 and 110 are combined with timing information to determine the angular velocity of supply reel motor 30 and the angular velocity of take-up reel motor 30, respectively.

Servo control circuit 102 is connected by a motor control PWM output line as well as by a motor direction signal line to tape load motor control circuit 120. Tape load motor control circuit 120 uses the PWM signal outputted by processor 100 to control tape load motor 50. Tape load motor 50 has an associated tachometer 122, shown in FIG. 1A in the form of a photointerrupter which creates electrical pulses when a peripherally toothed disk, mounted on the output shaft of motor 50, permits transmission of light from a transmitter to a receiver of the photointerrupter. The pulses generated by tape load tachometer 104 are transmitted to an unillustrated tape load position counter included in servo control circuit 102. The tape load position counter counts the pulses received from tape load tachometer 122 and generates a trolley position signal to processor 100.

Processor 100 is also connected via servo control circuit 102 to scanner motor drive circuit 150. Scanner motor drive circuit 150, like tape load motor control circuit 102, receives both a motor control PWM signal on a motor direction signal firom servo control circuit 102. Scanner motor drive circuit 150 controls scanner motor 152. Scanner motor 152 causes rotation of scanner 90. Scanner 90 has a tachometer 154 in the form of a Hall Sensor which issues one tach pulse per revolution of scanner 90. Scanner tachometer 154 is connected to scanner period counter 156 provided in servo control circuit 102.

Processor 100 has access to memory 160. Preferably memory 160 is a semiconductor memory such as a random access memory (RAM). When a tape T is inserted into tape drive 20, as hereinafter described memory 160 has loaded therein, among other variables and values used for execution of tape drive 20, a tape wear log 170 for the inserted tape.

Processor 100 is also connected by a signal line 174 to an output device, such as display device 176. Display device 176 can be any type of display device, such as an LED or LCD output display which is connected to processor 100 via an output driver.

Figure 5:
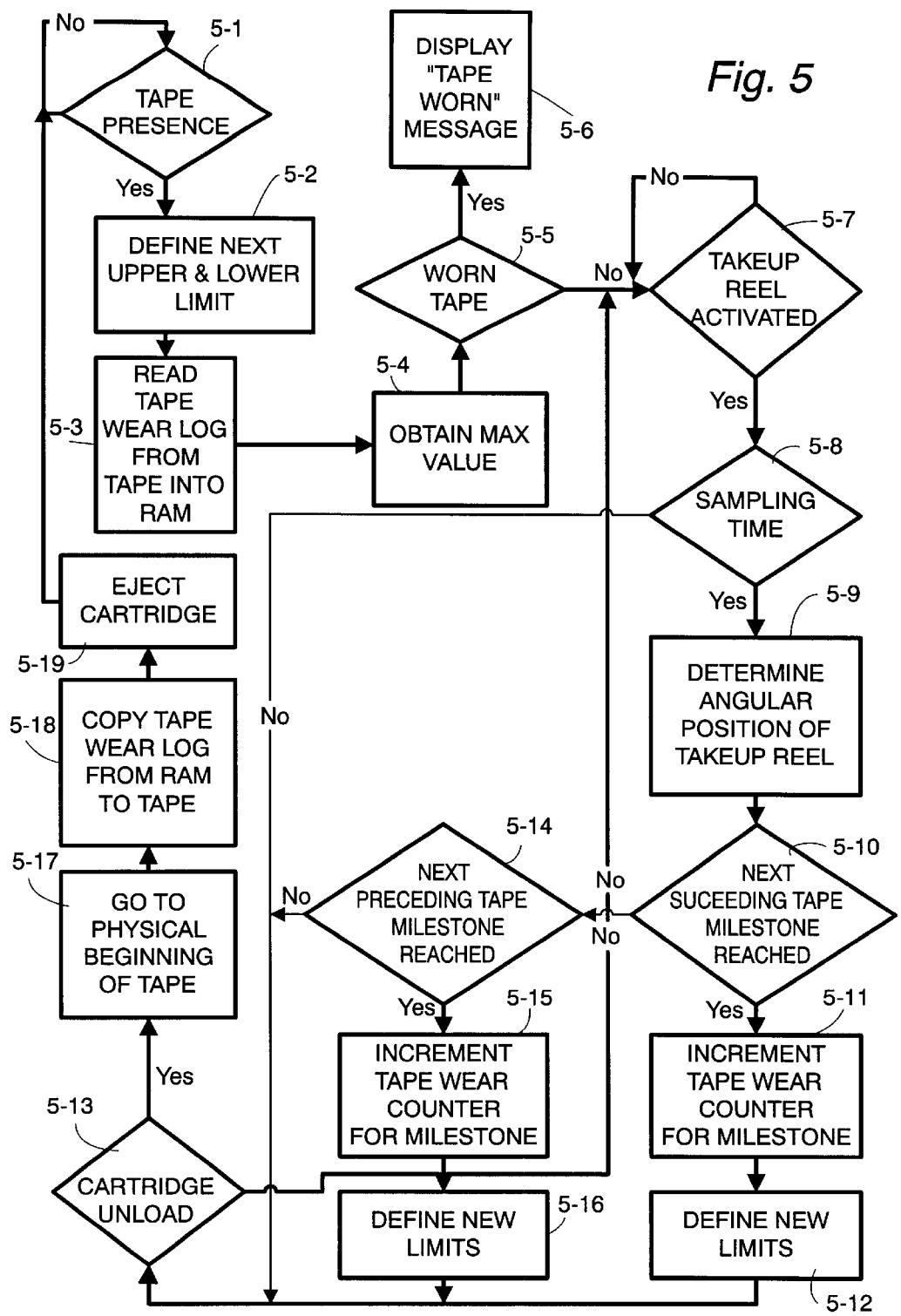
FIG. 5 is a flowchart showing steps performed by the tape drive of FIG. 1A for monitoring tape wear and providing a worn tape indication.

Among the functions served by processor 100 is that of a tape wear monitor 180. FIG. 5 depicts basic steps performed by tape drive 20 for monitoring the wear of a tape T of a cartridge 34 inserted into tape drive 20. The steps of FIG. 5 are understood with reference to FIG. 6, which shows one example contents of a representative tape wear log 170 relative to an example magnetic tape T.

As shown in FIG. 6, tape T is formatted to have an physical beginning of tape (PBOT) and a logical beginning of tape (LBOT). Tape drive begins writing/reading user data at the logical beginning of tape (LBOT). After the logical beginning of tape (LBOT), the tape T is conceputalized as having plural tape wear milestones MS1, MS2, . . . MSn. In the embodiment shown in FIG. 6, the tape wear milestones MS1, MS2, . . . MSn are uniformly distributed from the logical beginning of tape (LBOT) to the logical end of tape (LEOT).

The procedure of FIG. 5 begins at step 5-1 with detection of the presence of tape in tape drive 20. Actually, the detection of step 5-1 is not only of the tape, but of the cartridge 34 in which the tape is housed. In this regard, the presence of cartridge 34 is determined by a sensor, which applies a TAPE PRESENCE signal to processor 100 as shown in FIG. 2. The cartridge (i.e., tape) presence sensor can be any type of sensor, such as an optical sensor which is interrupted by the insertion of a cartridge into tape drive 20.

After a cartridge 34 is sensed in tape drive 20 and the tape T is extracted therefrom, at step 5-2 processor 100 initializes the parameters NEXT UPPER LIMIT and NEXT LOWER LIMIT to be zero plus a fixed offset. These limits represent the nearest two milemarkers. Since the tape was just loaded at step 5-1, the current position is (by definition) zero.

At step 5-3 processor 100 issues a command which causes the reading of an initial tape wear log TWL from the tape T and into memory 170. As shown in FIG. 6, the initial tape wear log TWL is stored between the physical beginning of tape (PBOT) and the logical beginning of tape (LBOT), and preferably at the physical beginning of tape (PBOT).

FIG. 6 shows portions of an example tape wear log, obtained from the initial tape wear log TWL from tape T, as stored in memory 160 and thereafter denominated as tape wear log 170. In the illustrations provided herein, the tape wear log 170 has n number of entries which correspond to the n number of tape wear milestones MS1, MS2, . . . MSn on the tape. For the particular embodiment of tape wear log 170 shown in FIG. 6, the processor 100 knows that each entry contains a number indicative of the number of passes (of the tape wear milestone corresponding to the entry) past the transducing element, e.g., the heads mounted on scanner or drum 90 in the example embodiment of a helical scan tape drive. In other words, the first entry of tape wear log 170 shows that milestone MS1 of tape T has thus far had 993 passes past scanner 90; the second entry of tape wear log 170 shows that milestone MS2 of tape T has thus far had 528 passes past scanner 90; the third entry of tape wear log 170 shows that milestone MS3 of tape T has thus far had 400 passes past scanner 90; and so forth.

After storing tape wear log 170 in memory 160, at step 5-4 processor 100 obtains from tape wear log 170 a maximum value in the milestone array. Such maximum value is represented by the identifier MAX. The processor 100 then checks at step 5-5 to determine if tape T is worn. In one embodiment, at step 5-5 processor 100 checks whether the value of MAX is greater than a predetermined allowed limit. It should be understood, however, that the tape wear check of step 5-5 can be performed in various ways. Alternative criteria, e.g., involving counts in tape wear log 170 for a combination of milestones, are also envisioned.

If it is determined at step 5-5 that the tape is worn (e.g., the predetermined threshold is exceeded), processor 100 sends a tape wear signal on line 174 to output display device 176. At step 5-6, in response to the signal applied on line 174 the display device 176 is activated with an indication of tape wear. In the mode illustrated in FIG. 5, the display outputted on device 176 can read "WORN TAPE", or "TAPE LIFE EXCEEDED" for example.

In the event that a worn condition of tape T is not detected at step 5-5 at step 5-7 the processor 100 keeps checking whether the takeup reel motor 32 has been activated. The processor 100 knows when the takeup reel motor 32 has been activated in view of its supervision of takeup reel motor 32 and servo system signal conditioning circuit 102 and reel motor control circuit 104. When it is determined at step 5-7 that the takeup reel motor 32 has been activated, at step 5-8 the processor 100 determines whether it is time to sample the angular position of the takeup reel, i.e., of takeup reel motor 32. For example, processor 100 may have a clock or counter which is used to assess a sampling time at intervals of a few milliseconds.

The angular position $\theta_T$ of the takeup reel motor 32 can be determined using tach counts in accordance with principles well understood by the person skilled in the art (see, for example, U.S. Pat. No. 5,734,518 entitled METHOD AND APPARATUS FOR DETERMINING DESIRED ROTATIONAL VELOCITY OF TAKE-UP REEL FOR HELICAL SCAN RECORDER, which is incorporated herein by reference). In the illustrated embodiment, tach counts are applied to servo system signal conditioning circuit 102 on line 112 from the takeup reel motor tachometer 110 (see FIG. 2). Although the tach count from takeup reel motor tachometer 110 is applied to servo system signal conditioning circuit 102 on line 112 on reaching each tach count while the takeup reel motor 32 is rotating, only at specified times (known as "sampling times") does processor 100 use the tach count to compute the angular position of takeup reel motor 32. In one embodiment, the sampling rate is such that sampling times occur 16 milliseconds apart.

When it is determined at step 5-8 that a sampling time has been reached, at step 5-9 the angular position of takeup reel motor 32 is determined by processor 100. Then, a check is made at step 5-10 whether the current angular position of takeup reel motor 32 corresponds to one of the tape wear milestones MS1, MS2, . . . MSn of tape T. More specifically, in the illustrated embodiment at step 5-10 processor 100 checks whether the current angular position of takeup reel motor 32 corresponds to the NEXT UPPER LIMIT value (which is the next one of the tape wear milestones MS1, MS2, . . . MSn of tape T when the tape is moving in the forward direction).

In a more generalized sense, the check at step 5-10 as to whether one of the tape wear milestones MS1, MS2, . . . MSn has been reached involves comparing the angular position of takeup reel motor 32 as determined at step 5-7 with a set or array of angular positions which correspond to the tape wear milestones MS1, MS2, . . . MSn. In the embodiment shown in FIG. 6, the tape wear milestones MS1, MS2, . . . MSn are uniformly spaced on tape T. In particular, adjacent ones of the tape wear milestones MS1, MS2, . . . MSn are separated by an angular position of takeup reel motor 32 corresponding to 688 tach counts from tachometer 110. In other words, tape wear milestone MS1 (represented by the first entry in tape wear log 170) occurs at 688 tach counts; tape wear milestone MS2 (represented by the second entry in tape wear log 170) occurs at 1376 tach counts, and so forth. Such uniform spacing of the tape wear milestones MS1, MS2, . . . MSn simplifies step 5-8, so that the tach count obtained from tachometer 110 need only be divided by the uniform tach count value 688. If the quotient is within a predetermined range of an integer, the integer is used to determine which entry in tape wear log 170 is to be incremented.

When the one of the tape wear milestones MS1, MS2, . . . MSn which corresponds to the NEXT UPPER LIMIT value is reached, e.g., in the manner described above, at step 5-11 the entry in tape wear log 170 for that tape wear milestone is incremented. For example, tape wear log 170 of FIG. 6 shows that tape wear milestone MS1 has been passed 993 times; tape wear milestone MS1 has been passed 528 times; and so forth.

After the tape wear milestone in tape wear log 170 corresonding to the NEXT UPPER LIMIT has been incremented, new limits are defined at step 5-12. In particular, both the NEXT UPPER LIMIT and the NEXT LOWER LIMIT are incremented at step 5-12 by the fixed offset value in order to obtain new (e.g., updated) values of the variables NEXT UPPER LIMIT and NEXT LOWER LIMIT.

If it were determined at step 5-10 that the NEXT UPPER LIMIT had not been reached, processor 100 realizes that the tape might have been rewound rather than forwarded. For that reason, at step 5-14 processor 100 makes a similar check whether the current angular position of takeup reel motor 32 corresponds to the NEXT LOWER LIMIT value (which is the next one of the tape wear milestones MS1, MS2, . . . MSn of tape T when the tape is moving in the reverse direction). If it is determined at step 5-14 that the tape has been reversed and has reached the next preceding milestone, at step 5-15 the counter in tape wear log 170 for that next preceding milestone is incremented (in like manner as step 5-11) and new limits are defined at step 5-16. In particular, both the NEXT UPPER LIMIT and the NEXT LOWER LIMIT are decremented at step 5-16 by the fixed offset value in order to obtain new (e.g., updated) values of the variables NEXT UPPER LIMIT and NEXT LOWER LIMIT.

Thus, whenever one of the tape wear milestones MS1, MS2, . . . MSn is reached, the count for that particular one of the tape wear milestones MS1, MS2, . . . MSn is incremented in tape wear log 170 (at either step 5-11 or step 5-15, depending on tape direction). "Reaching" one of the tape wear milestones MS1, MS2, . . . MSn can occur when the tape T is transported in either direction, e.g., forward or reverse directions. Upon reaching one of the tape wear milestones MS1, MS2, . . . MSn, the milestone is always incremented regardless of tape direction.

The processor 100 periodically checks to determine whether it has received a CARTRIDGE UNLOAD signal from tape drive 20 (see FIG. 2). A CARTRIDGE UNLOAD signal occurs when a user activates an cartridge unload button or key on the exterior of the tape drive 20. The embodiment of FIG. 5 shows processor 100 checking after negative decisions are made for step 5-8, step 5-12, step 5-16, as well as after step 5-14, whether a CARTRIDGE UNLOAD signal has been received. Assuming that a CARTRIDGE UNLOAD signal is not received, execution returns back to step 5-7.

Thus, in view of the loop back to step 5-7, the sampling at step 5-8 and checking for milestones (step 5-10 and step 5-14) occurs so long as takeup reel motor 32 is activated. Therefore, when a sampling time has not been reached, execution returns to step 5-7 (unless a cartridge unload request has been received). Similarly, unless a CARTRIDGE UNLOAD signal is received, execution loops back to step 5-7 upon completion of step 5-12, step 5-16, and step 5-14.

When it is determined at step 5-13 that a CARTRIDGE UNLOAD signal has been received by processor 100, at step 5-17 the processor 100 prompts the servo system signal conditioning circuit 102 to cause the reel motor control circuit 104 to position (e.g., rewind) tape T to the location of the tape wear log (TWL) stored on tape T, e.g., to the physical beginning of tape (PBOT) in the illustrated embodiment. Then, at step 5-18, the contents of tape wear log 170 (as updated by processor 100 in the manner aforedescribed) and stored in memory 160 is copied onto tape T to replace the earlier (e.g., original) version of the tape wear log (TWL) store thereon. Thereafter, at step 5-19 the cartridge 34 is ejected from tape drive 20 in continued response to the CARTRIDGE UNLOAD signal. After supervising ejection of a cartridge, processor 100 resumes awaiting a further CARTRIDGE PRESENCE signal at step 5-1 upon insertion of a next cartridge 34 into tape drive 20.

Whenever the cartridge is next inserted into the same or another tape drive 20 with the tape wear monitoring capability of the present invention, the steps of FIG. 5 or steps similar are performed and the updated tape wear log (TWL) stored on the tape is obtained at step 5-3 for the next insertion. During the next insertion, further passes across any one of the tape wear milestones MS1, MS2, . . . MSn are added to the values already in the log in the manner described with reference to FIG. 5, thereby accumulating the lifetime wear record for the tape T.

Figure 5A:
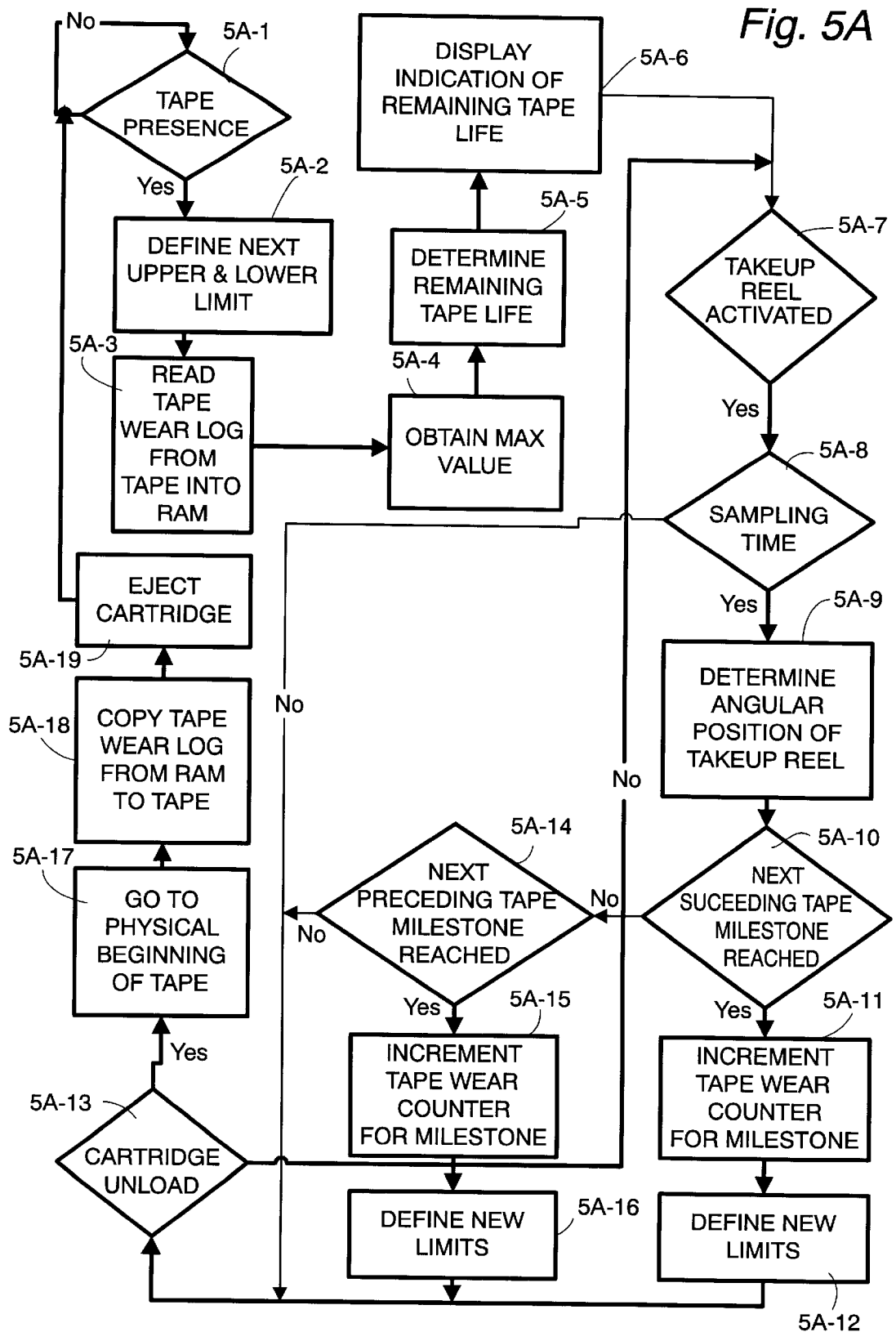
FIG. 5A is a flowchart showing steps performed by the tape drive of FIG. 1A for monitoring tape wear and providing an indication of remaining tape life.

FIG. 5A shows another embodiment of the invention wherein the tape wear monitoring system provides an indication of the remaining life of the tape T. The numbering of the steps of FIG. 5A resemble that of FIG. 5, with the exceptions that the step prefex 5A is employed and the steps 5A-5 and 5A-6 differ from steps 5-3 and 5-4 of FIG. 5. In particular, in the embodiment of FIG. 5A, after reading of the initial tape wear log (TWL) from tape T at step 5A-3, at step 5A-5 the processor 100 makes a determination of remaining life of the tape T. In this regard, at step 5A-5 the processor 100 can employ any of several strategies for determination of remaining life of the tape T. For example, a tape is considered to be unacceptably worn when any of the tape wear milestones MS1, MS2, . . . MSn thereof sustain 10,000 passes, for the tape T shown in FIG. 6 a remaining life calculation of 993/10,000 (about 10%) is performed. At step 5A-6, a signal is applied to display device 176 on line display device 174 which causes display device 176 to display an indication of remaining tape life. The display prompted at step 5A-6 could read, for example, "90% TAPE LIFE LEFT", or alternatively, "TAPE 10% WORN", for example. After the display of step 5A-6, processing continues with step 5A-7 in much the same manner as with step 5-7 of FIG. 5. The calculation of step 5A-5 can be made according to the following: MAX/(allowed limit)* 100%.

In the FIG. 5A embodiment described above, the indication of remaining tape life is provided with each load of cartridge 34. In variations of the FIG. 5A embodiment, the indication of remaining tape life may be provided less frequently or only upon or after reaching certain percentages of tape life, for example. Moreover, it should be understood that the embodiment of FIG. 5A can additionally provide the TAPE WORN message, when appropriate, of step 5-6 of FIG. 5.

Figure 6A:
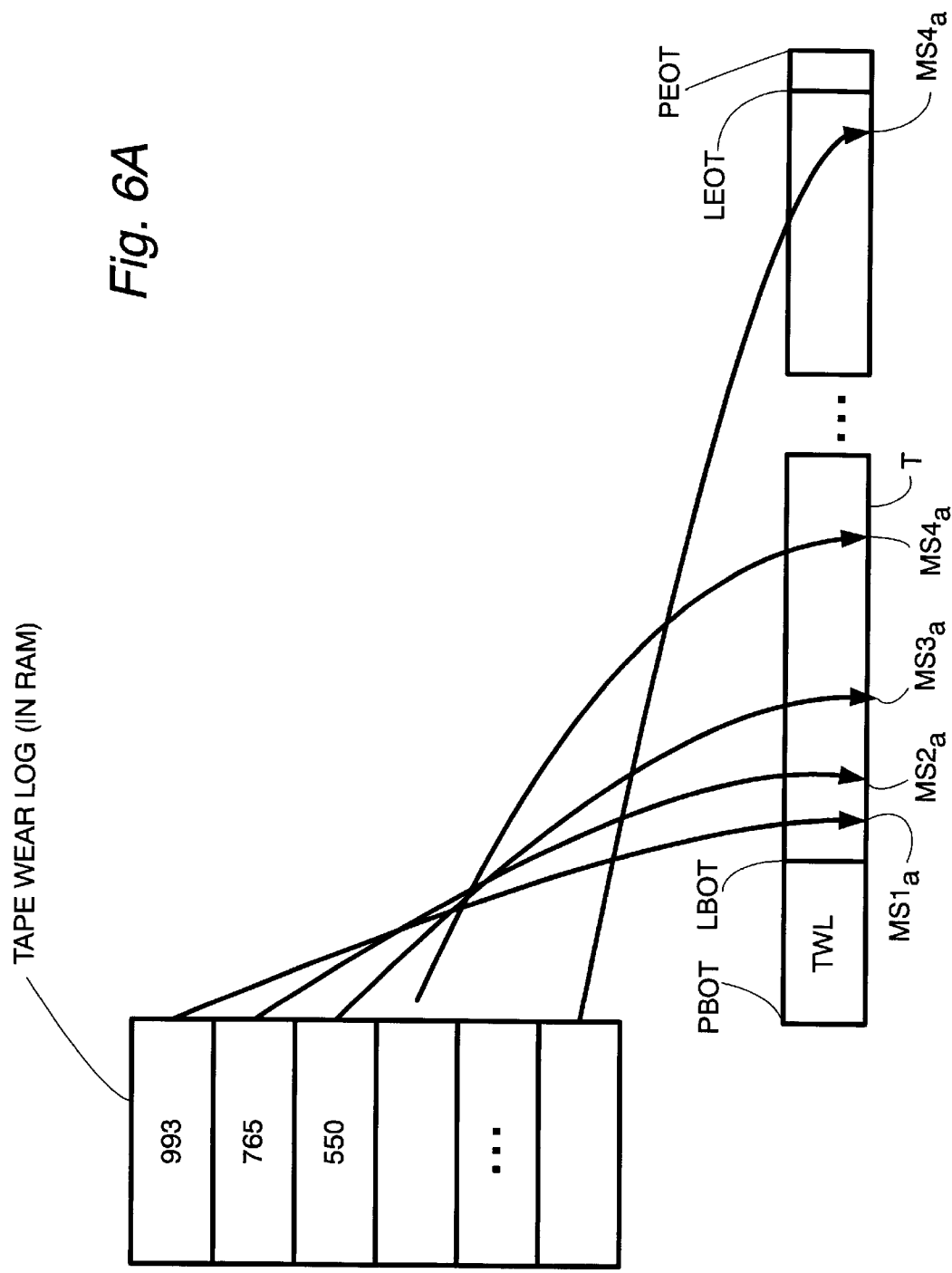
FIG. 6A is a diagrammatic view of a tape and a tape wear log and showing various milestones employed in monitoring tape wear according to another mode of the present invention, the milestones being spaced in non-uniform.

The embodiment of FIG. 6 has the tape wear milestones MS1, MS2, . . . MSn being uniformly spaced on the tape T. By contrast, the embodiment of FIG. 6A shows that the tape wear milestones $MS1_a$, $MS2_a$, . . . $Msn_a$ can be concentrated more closely together at a beginning of the media in accordance with a square law distribution. The embodiment of FIG. 6 caters to the fact that more tape motion typically takes place near the beginning of tape. By spacing the tape wear milestones $MS1_a$, $MS2_a$, . . . $Msn_a$ closer together near the beginning of tape, gaps in the tape wear log 170 are avoided without using an inordinately large array. In fact, the tape wear milestones $MS1_a$, $MS2_a$, . . . $Msn_a$ are spaced closer than the minimum start or stop distances of the tape drive, thereby insuring that all motions will be counted near the beginning of tape. Toward the end of the tape, the tape wear milestones $MS1_a$, $MS2_a$, . . . $Msn_a$ are spaced far enought apart that it is possible to reverse tape motion repeatedly without going past a milestone.

While the two milestone spacing strategies of FIG. 6 and FIG. 6A have been illustrated above, it should be understood that other strategies of spacing the tape wear milestones MS1, MS2, . . . MSn can be employed.

The present invention thus solves the tape wear detection problem by establishing an array of predefined locations on tape, the tape wear milestones MS1, MS2, . . . MSn, for which a pass in either direction is individually counted. In one embodiment, there are two hundred fifty such predefined locations which are collectively known as the tape wear log 170 or "pass count array". Each time the tape T goes past one of the tape wear milestones MS1, MS2, . . . MSn, a corresponding counter in RAM memory 160 is incremented. No special mark or data is recorded on the tape at these location. The tape drive 20 knows the location on tape by means of a high resolution counter on takeup reel motor 32. The instructions of processor 100 are coded in such a way that only the nearest two tape wear milestones MS1, MS2, . . . MSn need to be check against the present tape position, thus sparing the system a check on the entire array. The embedded processor 100 is easily able to make the check at a rate fast enough to insure that no milemarker will be missed.

In the foregoing description, an alphanumeric readout was the illustrated mode of providing a display on display device 176. It should be understood that other modes of display, such as a bar graph, can also be employed.

The amount of media, e.g., tape, required to store the milestone array (e.g., the media wear log) is but a tiny fraction of the total media capacity and represents negligible overhead. While the preferred embodiment employs an array of length 250, one could easily employ an array many times that long in order to eliminate the possibility that a significant number of tape motion reversals would to unrecorded because they occur between milestones. For instance, an array of length 170,000 would require 340,000 bytes of data and allow placement of a milestone every 0.1 cm of a standard 170 meter long tape. Yet this amount of data still represents only 0.017% of the total media capacity (e.g., 1 GB).

In practice, it is extremely unlikely that a tape would exhibit a motion history that would somehow dodge most of the milestone counters, so a much shorter array is be sufficient. Furthermore, the time required in software to make the position check against the nearest milemarkers is likewise quite small and represents only a tiny increase in microprocessor overhead. This time is not a function of the length of the array.

While the invention has been described in connection with what is presently considered to be the most practical and preferred embodiments and modes, it is to be understood that the invention is not to be so limited, but on the contrary, is intended to cover various modifications and equivalent arrangements included within the spirit and scope of the appended claims. For example, it will be apparent to the person skilled in the art that the principles of the wear monitoring method and apparatus described herein can be used in conjunction with media other than magnetic tape media, such as magnetic or optical disk media, for example.

What is claimed is:

1. Apparatus for transducing information relative to a recording media comprising:

a transducing element;

a transport system which transports the media whereby plural predetermined media wear milestones of the media make a pass proximate the transducing element so that information can be transduced with respect to the media;

a media wear monitoring system which determines when a pass occurs with respect to each of the plural predetermined media wear milestones on the media, and which provides an indication of media wear;

wherein the media wear monitoring system includes a media wear log stored in a memory, the media wear log including an indication of a number of passes which has occurred with respect to each of the plural media wear milestones.

2. The apparatus of claim 1, wherein the media wear milestones are essentially uniformly distributed along a linear length of the media.

3. The apparatus of claim 1, wherein the media wear milestones are concentrated more closely together at a beginning of the media.

4. The apparatus of claim 3, wherein the media wear milestones are concentrated more closely together at a beginning of the media in accordance with a square law distribution.

5. The apparatus of claim 1, wherein the media wear monitoring system includes a processor which detects reaching of a given media wear milestone and in the media wear log increments the indication of the number of passes for the given media wear milestone.

6. The apparatus of claim 1, wherein upon loading of the media into the apparatus the media wear monitoring system reads an initial version of the media wear log from the media into the memory.

7. The apparatus of claim 1, wherein during transport of the media the media wear monitoring system detects reaching of media wear milestones and updates the media wear log, with respect to media wear milestones reached during the transport of the media, by incrementing the indication of the number of passes for the reached media wear milestones, and wherein upon unloading of the media from the apparatus, the media wear monitoring system writes an updated media wear log on the media.

8. A The apparatus of claim 1, wherein the updated media wear log is written to a physical beginning of the media.

9. The apparatus of claim 8 wherein the media wear monitoring system generates a signal indicative of worn media when a predetermined number of passes has occurred for one of the media wear milestones on the media.

10. The apparatus of claim 1, wherein the media wear monitoring system generates a signal indicative of extent of wear of the media.

11. The apparatus of claim 10, wherein the media wear monitoring system generates a signal related to extent of remaining useful life of the media.

12. The apparatus of claim 11, further comprising an output device, and wherein the signal related to extent of remaining useful life of the media is applied to the output device.

13. The apparatus of claim 12, wherein the output device is a display device.

14. The apparatus of claim 1, wherein the media is magnetic tape.

15. Apparatus for transducing information relative to a recording media comprising:

a transducing element;

a transport system which transports the media whereby plural predetermined media wear milestones of the media make a pass proximate the transducing element so that information can be transduced with respect to the media;

a media wear monitoring system which determines when a pass occurs with respect to each of the plural predetermined media wear milestones on the media, and which provides an indication of media wear;

wherein the media wear monitoring system generates a signal indicative of worn media when a predetermined number of passes has occurred for one of the media wear milestones on the media.

16. The apparatus of claim 15, further comprising an output device, and wherein the signal indicative of worn media is applied to the output device.

17. The apparatus of claim 16, wherein the output device is a display device.

18. A. Apparatus for transducing information relative to a recording media comprising:

a transducing element;

a transport system which transports the media whereby the media makes a pass proximate the transducing element so that information can be transduced with respect to the media;

a processor serves as a media wear indicator by determining when a pass occurs with respect to each of plural predetermined media wear milestones on the media, and which provides an indication of media wear;

wherein the processor includes a media wear log stored in a memory, the media wear log including an indication of a number of passes which has occurred with respect to each of the plural medial wear milestones.

19. The apparatus of claim 18, wherein the media wear milestones are essentially uniformly distributed along a linear length of the media.

20. The apparatus of claim 18, wherein the media wear milestones are concentrated more closely together at a beginning of the media.

21. The apparatus of claim 20, wherein the media wear milestones are concentrated more closely together at a beginning of the media in accordance with a square law distribution.

22. The apparatus of claim 18, wherein the processor detects reaching of a given media wear milestone and in the media wear log increments the indication of the number of passes for the given media wear milestone.

23. The apparatus of claim 18, wherein upon loading of the media into the apparatus the processor reads an initial version of the media wear log from the media into the memory.

24. The apparatus of claim 18, wherein during transport of the media the processor detects reaching of media wear milestones and updates the media wear log, with respect to media wear milestones reached during the transport of the media, by incrementing the indication of the number of passes for the reached media wear milestones, and wherein upon unloading of the media from the apparatus, the processor writes an updated media wear log on the media.

25. The apparatus of claim 18, wherein the updated media wear log is written to a physical beginning of the media.

26. The apparatus of claim 18, wherein the processor generates a signal indicative of extent of wear of the media.

27. The apparatus of claim 26, wherein the processor generates a signal related to extent of remaining useful life of the media.

28. The apparatus of claim 27, further comprising an output device, and wherein the signal related to extent of remaining useful life of the media is applied to the output device.

29. The apparatus of claim 28, wherein the output device is a display device.

30. The apparatus of claim 18, wherein the media is magnetic tape.

31. Apparatus for transducing information relative to a recording media comprising:

a transducing element;

a transport system which transports the media whereby the media makes a pass proximate the transducing element so that information can be transduced with respect to the media;

a processor which serves as a media wear indicator by determining when a pass occurs with respect to each of plural predetermined media wear milestones on the media, and which provides an indication of media wear; and wherein the processor generates a signal indicative of worn media when a predetermined number of passes has occurred for one of the media wear milestones on the media.

32. The apparatus of claim 31, further comprising an output device, and wherein the signal indicative of worn media is applied to the output device.

33. The apparatus of claim 32, wherein the output device is a display device.

34. A method of operating apparatus for transducing information relative to a recording media, the method comprising:

(1) transporting the media whereby the media makes a pass proximate a transducing element so that information can be transduced with respect to the media;

(2) determining when a pass occurs with respect to each of plural predetermined media wear milestones on the media, and (3) in accordance with the determination of step (2), providing an indication of media wear; and (4) storing a media wear log in a memory, the media wear log including an indication of a number of passes which has occurred with respect to each of the plural media wear milestones.

35. The method of claim 34, wherein the media wear milestones are essentially uniformly distributed along a linear length of the media.

36. The method of claim 34, wherein the media wear milestones are concentrated more closely together at a beginning of the media.

37. The method of claim 36, wherein the media wear milestones are concentrated more closely together at a beginning of the media in accordance with a square law distribution.

38. The method of claim 34, further comprising using a processor to detect reaching of a given media wear milestone and, in the media wear log, to increment the indication of the number of passes for the given media wear milestone.

39. The method of claim 34, wherein upon loading of the media into the apparatus, reading an initial version of the media wear log from the media into the memory.

40. The method of claim 34, wherein during transport of the media, detecting reaching of media wear milestones and updating the media wear log, with respect to media wear milestones reached during the transport of the media, by incrementing the indication of the number of passes for the reached media wear milestones, and wherein upon unloading of the media from the apparatus, writing an updated media wear log on the media.

41. The method of claim 34, further comprising writing the updated media wear log to a physical beginning of the media.

42. The method of claim 34, further comprising generating a signal indicative of worn media when a predetermined number of passes has occurred for one of the media wear milestones on the media.

43. The method of claim 34, further comprising generating a signal indicative of worn media when a predetermined number of passes has occurred for one of the media wear milestones on the media.

44. The method of claim 43, further comprising applying the signal indicative of worn media to the output device.

45. The method of claim 44, further comprising displaying an the indication of worn media by applying the signal indicative of worn media to a display device.

46. The method of claim 34, further comprising generating a signal indicative of extent of wear of the media.

47. The method of claim 46, wherein the signal indicative of extent of wear of the media is related to extent of remaining useful life of the media.

48. The method of claim 47, further comprising applying the signal related to extent of remaining useful life of the media to an output device.

49. The method of claim 48, further comprising displaying an the indication of extent of remaining useful life of the media by applying the signal indicative of extent of remaining useful life of the media to a display device.

50. The method of claim 34, wherein the media is magnetic tape.

* * * * *